United States Patent
Wood et al.

(10) Patent No.: US 7,986,970 B2
(45) Date of Patent: *Jul. 26, 2011

(54) SYSTEMS AND METHODS FOR MAINTAINING DATA INTEGRITY OF REMOVABLE MEDIA OF AN ELECTRONIC DEVICE

(75) Inventors: Robert Henderson Wood, Waterloo (CA); Jacek Pawel Nawrot, Kitchener (CA); Michael Andrew Goldsmith, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/750,756

(22) Filed: Mar. 31, 2010

(65) Prior Publication Data

US 2010/0185786 A1 Jul. 22, 2010

Related U.S. Application Data

(63) Continuation of application No. 11/625,892, filed on Jan. 23, 2007, now Pat. No. 7,725,131.

(51) Int. Cl.
*H04B 1/38* (2006.01)
*H03K 3/00* (2006.01)
(52) U.S. Cl. ..................... 455/558; 455/575.1
(58) Field of Classification Search ............... 455/550.1, 455/558, 575.1, 575.8, 572
See application file for complete search history.

(56) References Cited

U.S. PATENT DOCUMENTS

| | | | |
|---|---|---|---|
| 6,546,460 | B1 | 4/2003 | Iida et al. |
| 2002/0024846 | A1 | 2/2002 | Kawahara et al. |
| 2002/0039916 | A1 | 4/2002 | Hosoi |
| 2004/0141065 | A1 | 7/2004 | Hara et al. |

FOREIGN PATENT DOCUMENTS

| | | |
|---|---|---|
| CN | 1305185 A | 7/2001 |
| EP | 1531385 A2 | 5/2005 |
| JP | 08129531 A | 5/1996 |
| JP | 10091540 A | 4/1998 |
| JP | 2006050254 A | 2/2006 |

OTHER PUBLICATIONS

"File Allocation Table", Wikipedia, The Free Encyclopedia, pp. 1-21. Available: http://en.wikipedia.org/wiki/File_Allocation_Table#Design. Retrieved: Jan. 12, 2007.
European Search & Examination Report received on a related European Application No. EP07101035.9, dated Jun. 29, 2007.
European Communication under Rule 71(3) EPC received on a related European Application No. EP07101035, dated Apr. 2, 2008.
European Search and Examination Report received on a related European Application No. 08162170, dated Nov. 12, 2008.
European Communication pursuant to Article 94(3) EPC received on a related European Application No. 08162170.8, dated Feb. 24, 2009.
European Communication under Rule 71(3) EPC received on a related European Application No. 08162170.8 dated, Jul. 30, 2009.
European Examination Report received on a related European Application No. 09165336.0, dated Dec. 8, 2009.
European Search & Examination Report received on a related European Application No. 09177240.0, dated Jan. 27, 2010.
European Examination report received on received on a related European Application No. 09177240.0, dated Apr. 15, 2010.
European Examination Report ( European Application No. 09177240.0) dated Aug. 19, 2010.
Chinese Office Action (Application No. 200710196111.4) dated Jul. 13, 2010.
European Communication under Rule 71(3) EPC ( European Application No. 09177240.0) dated Feb. 11, 2011.
U.S. Office Action (from parent U.S. Appl. No. 11/625,892, now patent No. 7,725,131) dated Jul. 21, 2009.
European Examination Report ( European Application No. 09065336.0) dated Nov. 25, 2010.
Canadian Office Action (Application No. 2,611,368), dated Mar. 3, 2011.

*Primary Examiner* — Lee Nguyen
(74) *Attorney, Agent, or Firm* — Bereskin & Parr LLP/S.E.N.C.R.L., s.r.l.

(57) ABSTRACT

The described embodiments relate generally to methods, systems and devices for maintaining data integrity of a removable media card of a handheld electronic device, particularly when such media card is removed from such device.

19 Claims, 9 Drawing Sheets

SYSTEMS AND METHODS FOR MAINTAINING DATA INTEGRITY OF REMOVABLE MEDIA OF AN ELECTRONIC DEVICE

CROSS REFERENCE TO RELATED APPLICATION

This application is a continuation of prior U.S. patent application Ser. No. 11/625,892 filed on Jan. 23, 2007, the entirety of which is hereby incorporated by reference.

TECHNICAL FIELD

The described embodiments relate generally to methods and systems for maintaining data integrity of a removable media card of an electronic device, particularly when such media card is removed from the electronic device. Described embodiments also relate to an electronic device employing such systems and methods.

BACKGROUND

Mobile devices often provide multimedia functionality. Because of their size, static and moving digital images and sound files (among other types of data files) are commonly stored on data storage media cards usually employing flash memory (and accordingly sometimes referred to as flash memory cards) or other non-volatile data storage that can be electrically erased and reprogrammed. Occasionally, the user of the mobile device will want to remove the media card. This may be because the user wants to replace it with another media card having more available storage space. Alternatively, the user may simply want to transfer the media card to another electronic device to access or duplicate the stored data files. As discussed below, the untimely removal of a media card may result in the loss of the data stored on the card.

In most instances, such media cards are formatted with a FAT (file allocation table) file system. Given the ubiquitous nature of FAT file systems, this ensures interoperability with a wide range of systems and devices. A file allocation table stores organizational data indicating, among other things, sector addresses where different segments of each data file are stored on the media card.

An inherent weakness of the FAT file system is that a data sector can only be modified with a "read-modify-erase-write" operation. As a result, a catastrophic event (such as a power loss, or untimely removal of the media card) during an update of the allocation table could result in the entire allocation table being lost. In such a circumstance, the operating system would be unable to locate and hence access the data in the data files, despite the fact that such data would likely still exist.

A backup copy of the allocation table may be used to mitigate against such data loss, but various implementations of FAT file systems either utilize such a backup either inconsistently or not at all. Further, some flash memory devices may store both copies of the allocation table in the same sector, thereby risking loss of both copies simultaneously.

Similarly, the directory entries stored on the media card are also at risk, and are scattered throughout the disk. These entries do not benefit from the FAT redundancy (which as mentioned is inconsistently used).

It is desired to address or ameliorate one or more shortcomings or disadvantages associated with existing ways of removing a media card from a mobile device, or to at least provide a useful alternative to such ways.

BRIEF DESCRIPTION OF THE DRAWINGS

For a better understanding of the described embodiments and to show more clearly how they may be carried into effect, reference will now be made, by way of example, to the accompanying drawings in which.

DETAILED DESCRIPTION

Figure 1:
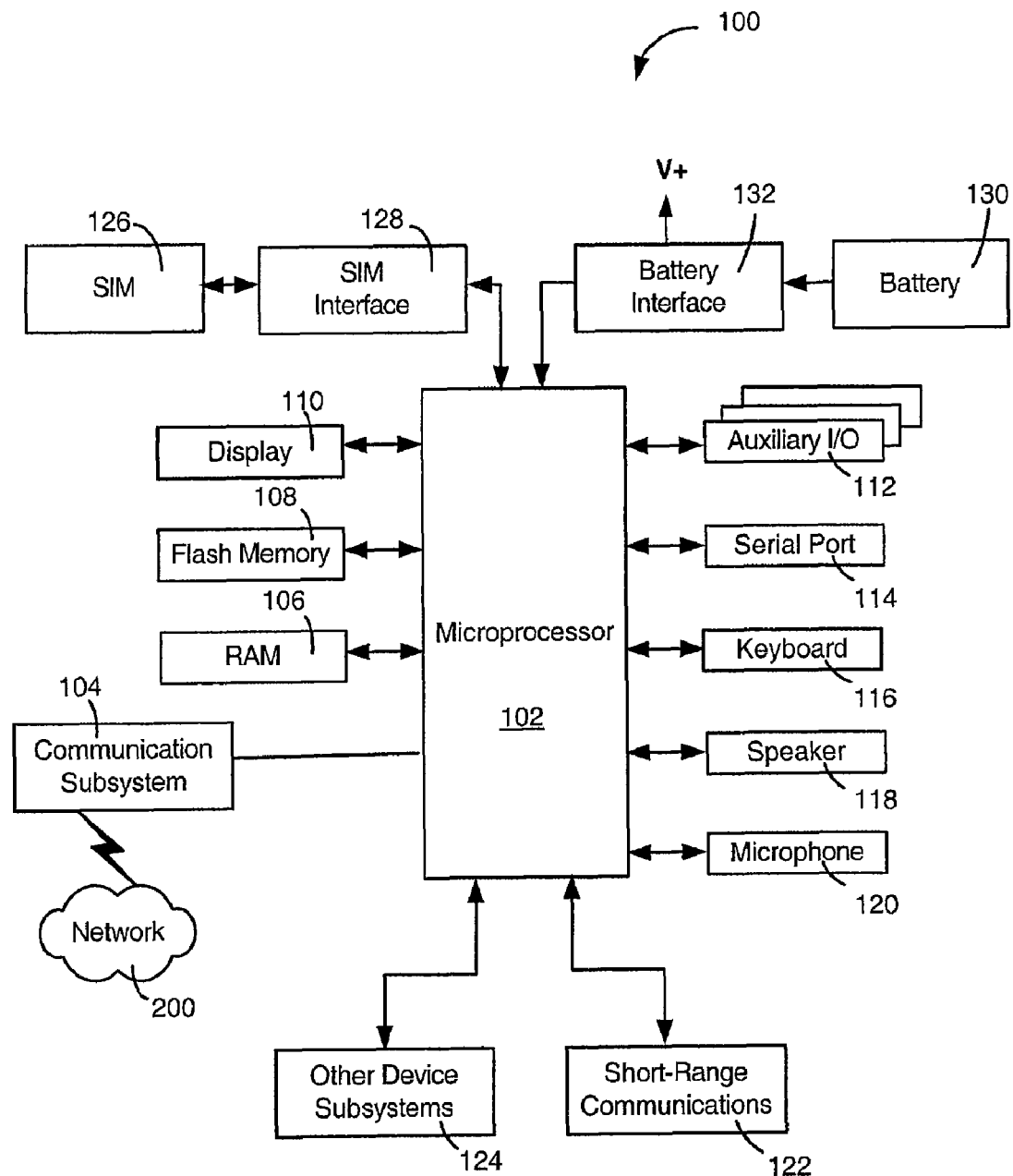
FIG. 1 is a block diagram of a mobile device in one example implementation.

The described embodiments relate generally to methods, systems and devices for maintaining data integrity of a removable media card of a handheld electronic device, particularly when such media card is in fact removed from such device or when a battery supply is removed.

Certain embodiments relate to a method for maintaining data integrity of a removable media card of a handheld electronic device. The device comprises: a media port located within the housing and configured to releasably receive the media card; a barrier movable from a closed position to an open position, wherein in the closed position access to the media port is restricted; and a barrier detector operatively coupled to the barrier and configured to detect when the barrier is moved from the closed position. The method comprises: detecting when the barrier is moved from the closed position; and updating the data stored on the removable media card.

The data stored on the media card may comprise file allocation table data and the updating step may comprise updating the file allocation table data.

The method may further comprise providing on a screen of a display of the handheld electronic device a display image notifying the user of the occurrence of one or more predetermined events in relation to the handheld electronic device. Such predetermined event may include detecting that the media card has been removed from the media port and the display image may notify the user that the media card has been removed from the media port. The predetermined event may alternatively or in addition include detecting that a media card has been inserted into the media port and the display image may notify the user that the media card has been inserted into the media port.

The method may comprise providing a sensory indicator to the user upon detection of the movement of the barrier from the closed position. The sensory indicator may comprise an audible tone and/or a display image on a screen of a display of the handheld electronic device. The display image may request user input from the user corresponding to the user's intentions regarding removal of the media card. The method may further comprise enabling receipt of the user input via a user input component of the handheld electronic device, the user input component enabling selection of predefined user input responses. The user input component may include at least one of: a keyboard, a trackwheel, a track-ball, a directional pad and a joystick.

Further embodiments relate to a handheld electronic device, comprising: a housing; a media port located within the housing and configured to releasably receive a storage media card; a barrier movable from a closed position to an open position, wherein in the closed position access to the media port is restricted; a barrier detector operatively coupled to the barrier and configured to detect when the barrier is moved from the closed position; a processor operatively coupled to the media port and to the barrier detector; memory storage accessible to the processor and storing program code executable by the processor for executing a media memory preservation application, wherein the media memory preservation application is configured to cause the processor to update the data stored on the storage media card.

The device may also comprise a chamber within the housing, wherein the media port is positioned within the chamber and wherein the chamber is configured to receive the media storage card. The barrier may comprise a chamber cover. In some implementations, the chamber may comprise a battery chamber and the chamber cover may comprise a battery cover. Further, wherein the detector may comprise a contact switch operatively coupled to the cover and to the housing.

The storage media card may comprise a flash memory card. As well, the stored data comprises a file allocation table. The device may comprise operating system code wherein the media memory preservation application is configured to cause the processor to unmount the media card from an operating system of the electronic device.

The handheld electronic device may be a mobile device that communicates with other devices. To aid the reader in understanding the structure of the mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 is typically programmed with an operating system 103 and controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 is configured for cellular communication in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS).

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software 103 code used by microprocessor 102 is typically stored in a persistent store such as flash memory 108, which may alternatively be a read-only memory (ROM) or similar storage element (not shown). Those skilled in the art will appreciate that the operating system code 103, specific device applications, or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing media transfers, such as music and/or image downloading or streaming, and messaging, such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information. In certain embodiments, SIM 126 may comprise a different type of user identifier and may be integral to mobile device 100 or not present at all.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, and one or more roller wheels with dynamic button pressing capability. Keyboard 116 comprises an alphanumeric keyboard and/or telephone-type keypad. A composed item may be transmitted over network 200 through communication subsystem 104. User input components comprised in auxiliary I/O subsystem 112 may be used by the user to navigate and interact with a user interface of mobile device 100.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Figure 2:
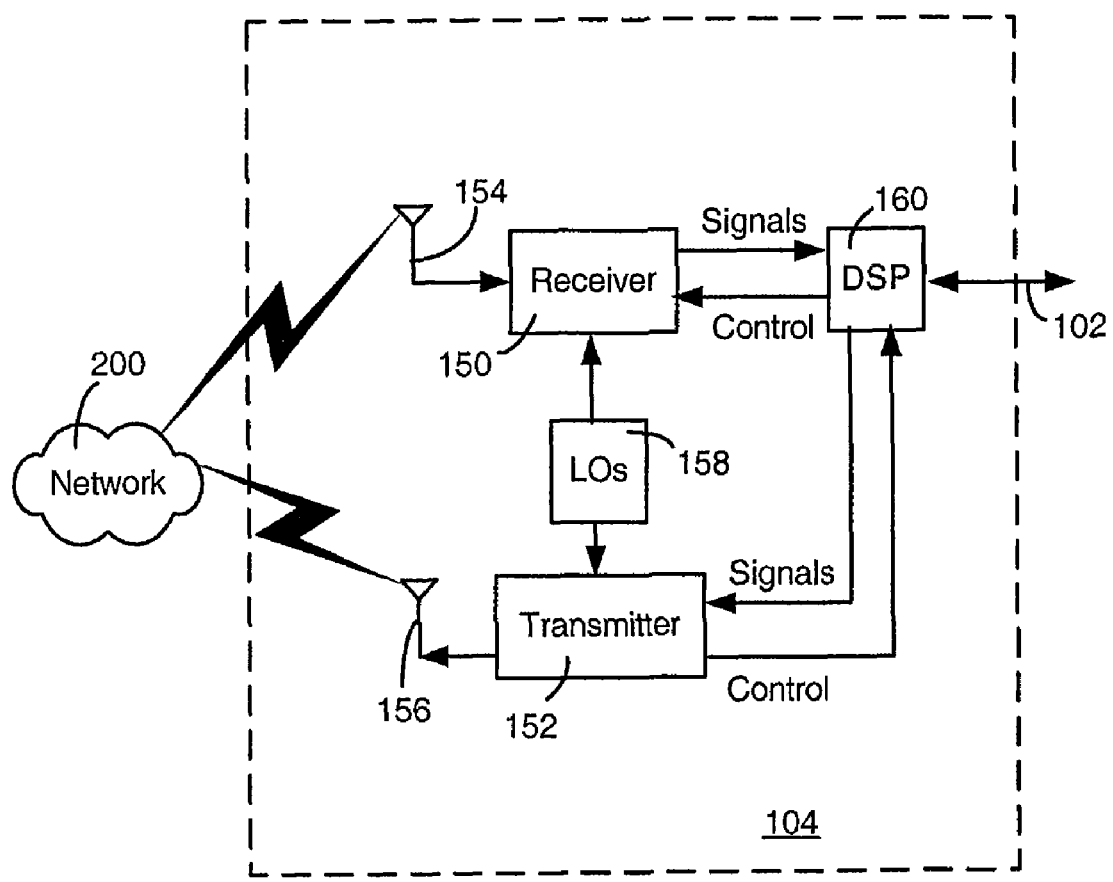
FIG. 2 is a block diagram of a communication sub-system component of the mobile device of FIG. 1.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (ND) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Figure 3:
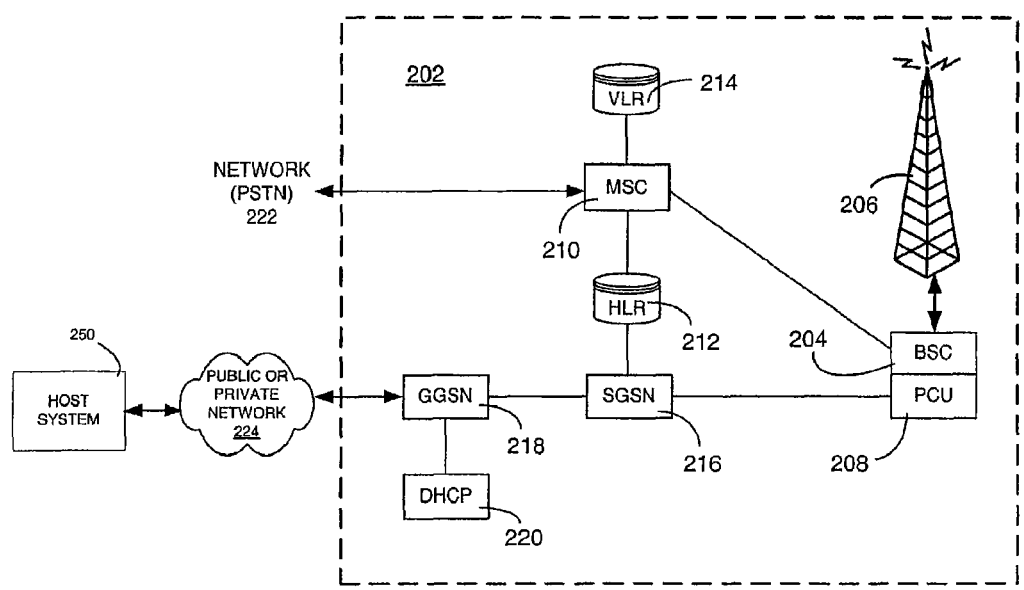
FIG. 3 is a block diagram of a node of a wireless network.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218.

There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Embodiments of mobile device 100 may be equipped and configured for communication over a cellular connection via communication subsystem 104 and with a wireless local area network (WLAN) using a communication form commonly termed "Wi-Fi". Such Wi-Fi connections may employ a suitable WLAN-compatible communication technology, of which unlicensed mobile access (UMA) technology is one example. UMA technology provides access to GSM and GPRS mobile services over unlicensed spectrum technologies, including Bluetooth™ and 802.11 wireless connections. UMA enables cellular network subscribers to roam and hand over between cellular networks and public and private wireless networks using dual-mode mobile handsets. Mobile device 100 may also be configured for communication with local wireless devices, such as Bluetooth™ enabled devices and may be configured for communication in a global positioning system (GPS) context.

The configuration and operation of an electronic device, such as mobile device 100, in the context of maintaining data integrity of a removable media card is described in further detail in relation to FIGS. 4 to 9. The embodiments described in relation to FIGS. 4 to 9 are primarily concerned with enabling quick and efficient removal of a media card, while reducing the risk of corruption of the data stored thereon.

Figure 4:
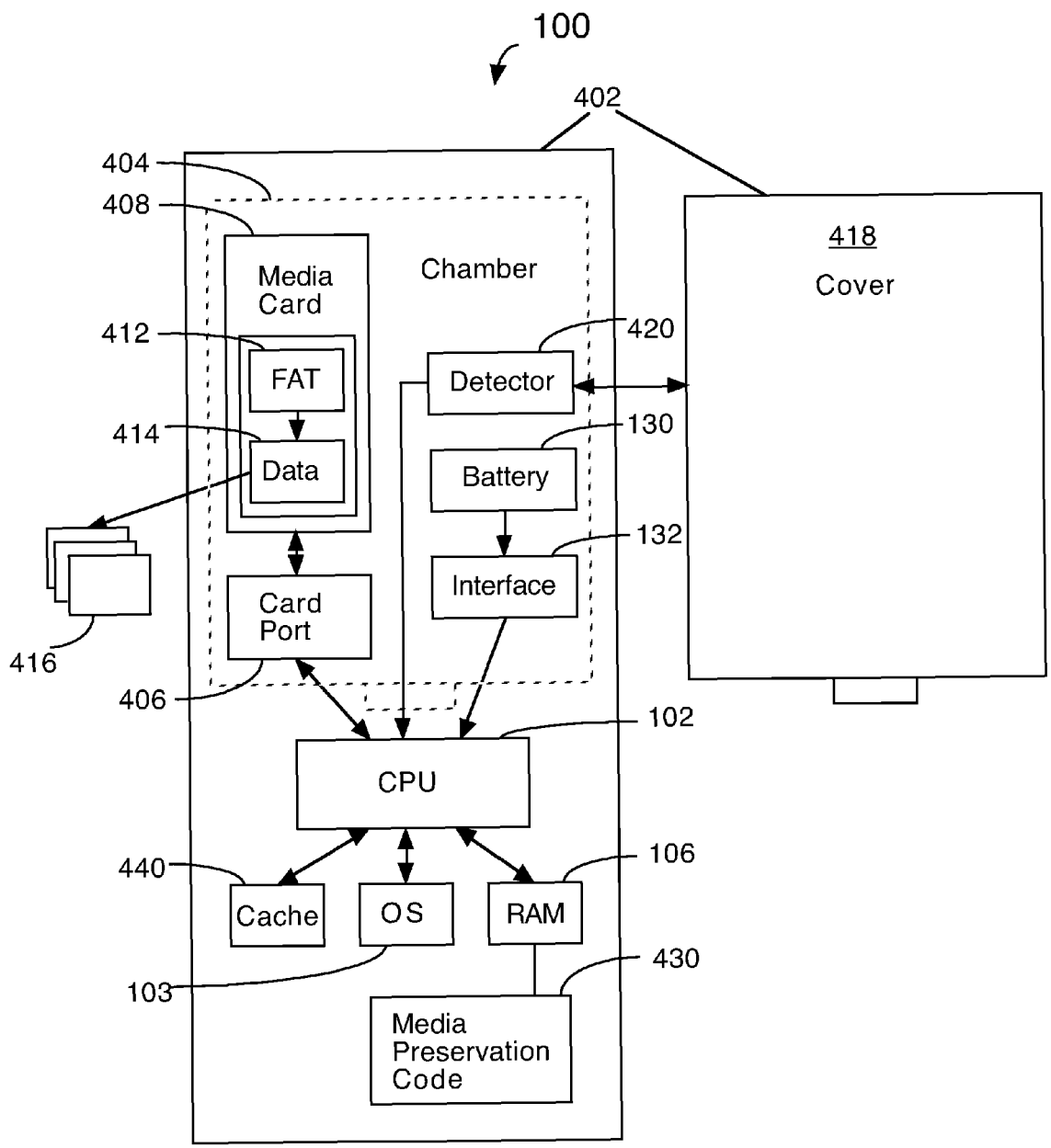
FIG. 4 is a schematic diagram showing in further detail various components of the mobile device of FIG. 1, including components related to the media storage card.

Referring now to FIG. 4, components of mobile device 100 are shown and described in further detail. The device 100 includes a housing 402, typically formed of plastic or other suitable material for retaining and protecting the various components of the device 100. A chamber 404 is typically provided within the housing 402, and is configured to retain one or more media ports 406 together with one or more media cards 408. In some configurations (as shown in the illustrated example), the chamber 404 may be in the form of a battery chamber for storing the battery 130 and power interface 132 operatively coupled to the microprocessor 102. As will be understood, the media port 406 is configured to removably receive and operatively engage the media card 408, enabling removal and replacement of the memory storage 410 provided by the media card 408. The media port 406 is also operatively coupled to the CPU 102, thereby permitting the CPU 102 (and operating system 103) to access the memory storage 410 on the media card 408. In operation, the media card 408 is typically "mounted" and hence accessible by the operating system 103.

As noted previously, typically the media card 408 is formatted with a FAT file system structure. Accordingly, the media card data storage 410 may include both a file allocation table 412, together with the general file data storage 414 indexed by the table 412 which may also store the various directory entries. While the data storage 410 may store most types of data files, often the media card 408 is used to store large multimedia data files 416, such as static or moving digital image files or sound files.

Figure 5A:
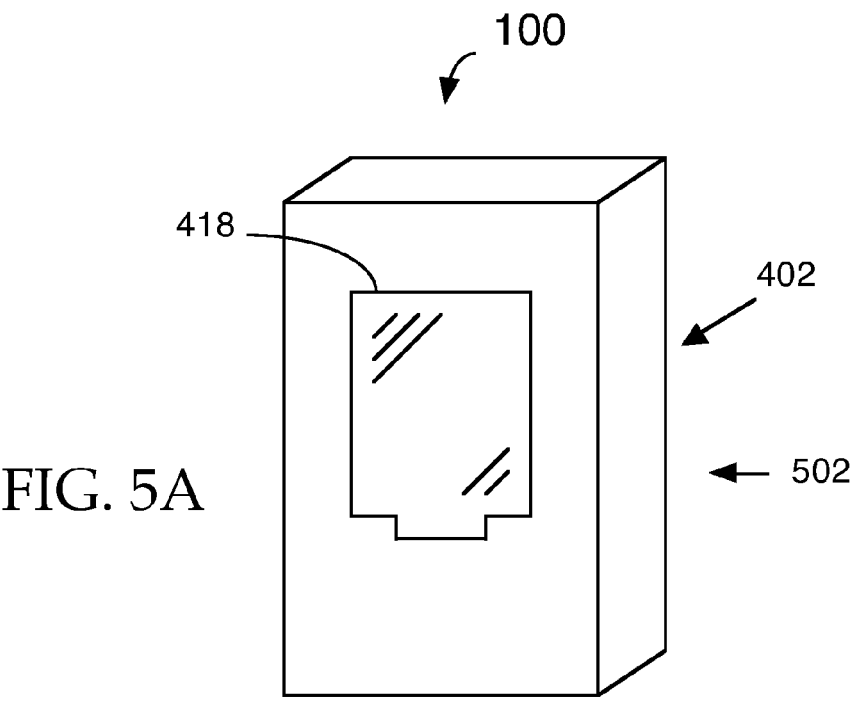
FIG. 5A is a schematic diagram showing the housing of the mobile device of FIG. 1, with the barrier in a closed position.
Figure 5B:
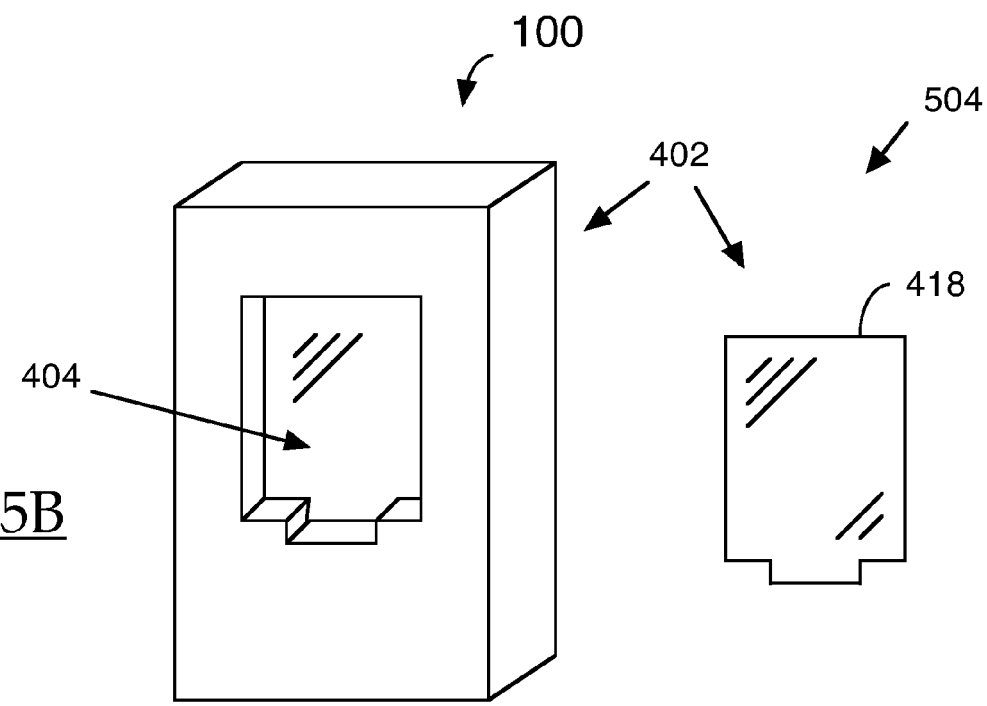
FIG. 5B is a schematic diagram showing the housing of the mobile device of FIG. 1, with the barrier in an open position.

A barrier or cover 418 is provided and typically forms part of the housing 402 (and may take the form of a battery cover 418 as shown in the illustrated example), which may restrict access to the media port 406 and media card 408. As illustrated in FIGS. 5A and 5B, the cover 418 may be moved from a closed or secure position 502, typically in engagement with the main body of the housing 402, to an open position 504, typically remote from the main body of the housing 402. In alternate configurations, the cover 418 may be in hinged or pivotal engagement to the main body of the housing 402.

As a further alternative configuration, it should be understood that the chamber 404 may be sized to substantially receive a media card 408 and media port 406, to form an externally accessible media card slot. With such a configuration, the cover 418 may comprise a dust flap.

As will be understood, in the closed position 502, the chamber 404 is typically closed or sealed, offering protection and preventing access to the components within the chamber 404, including the media port 406 and media card 408, and in the illustrated configuration, also the battery 130. In the open position 504, the user may access and physically interact with such components.

A barrier detector 420, is also provided, and may typically include a contact switch operatively coupled to the CPU 102. The switch 420 is configured to operatively engage the cover 418 and the housing, and may detect when the cover 418 is in the closed position 502. The CPU 102 is in electrical communication with the switch 420, and is thereby able to receive signals therefrom corresponding to when the cover 418 is moved from the closed position 502, the significance of which will be described in greater detail, below.

A media memory preservation application 430 stored as computer program instructions within flash memory 108 for execution by the CPU 102. Flash memory 108 comprises various other program code, such as other software applications, although these are not specifically shown for purposes of simplicity of illustration. Data storage also accessible by the CPU 102 may also include high speed cache memory 440.

Figure 6:
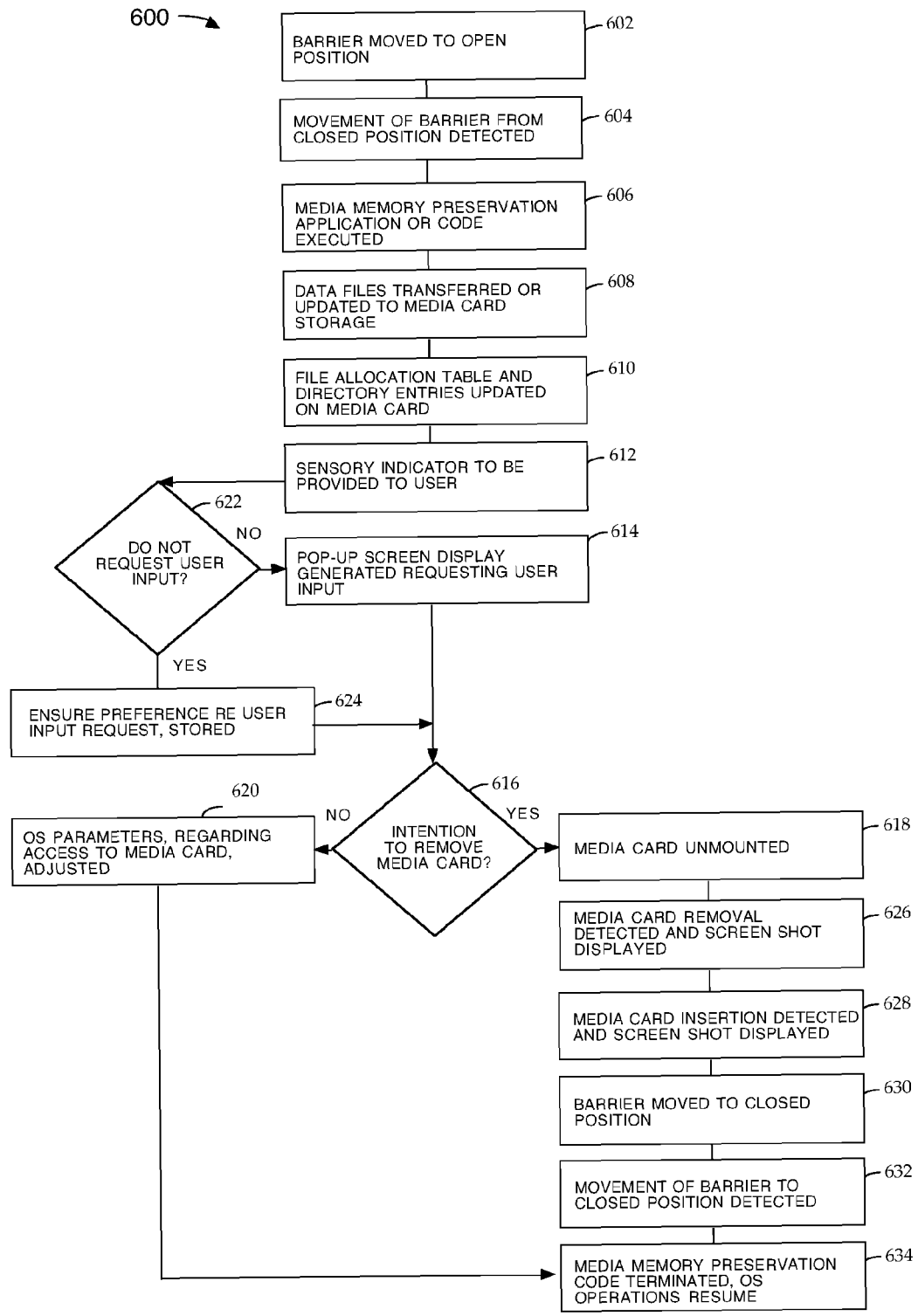
FIG. 6 is a flowchart of a method for maintaining the data integrity of a removable media card of the mobile device.
Figure 7:
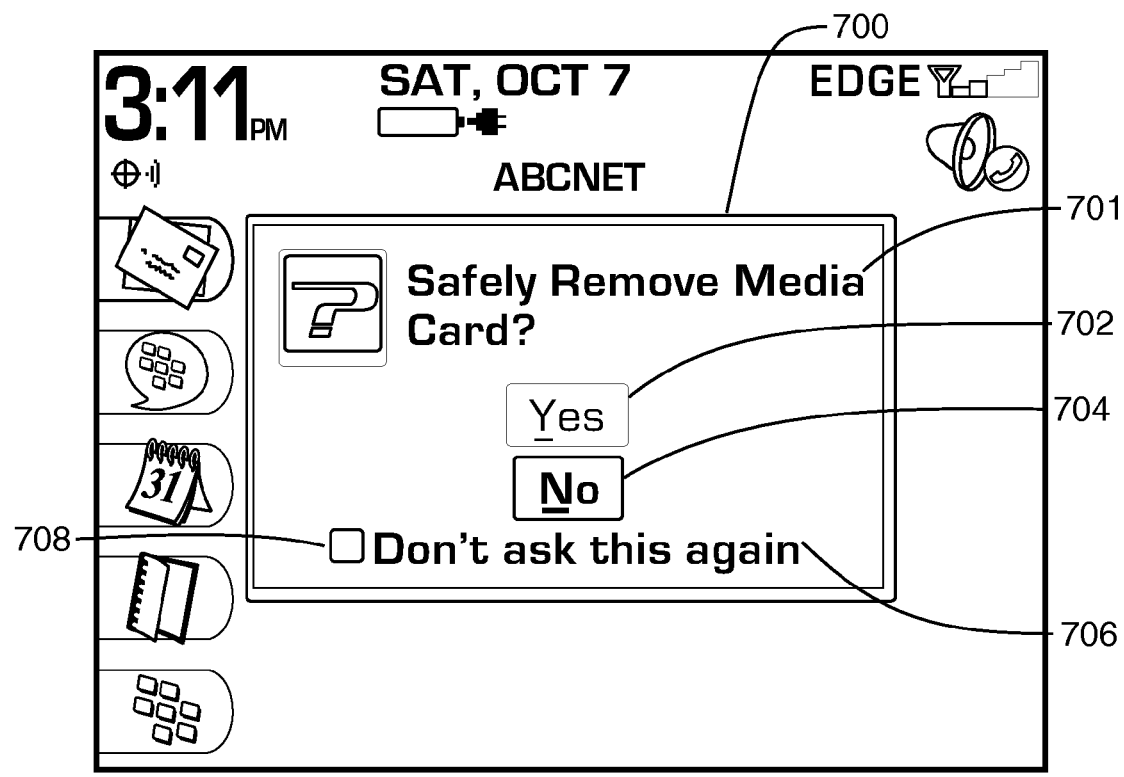
FIG. 7 is a screen shot of an example of a sensory indicator to the user in the form of a pop-up screen display shown on a display of the mobile device, generated upon detection of the movement of the barrier from the closed position.

Referring now to FIG. 6, there is shown a method 600 of preserving or maintaining the data integrity of the media card 408 of mobile device 100.

In operation, the method 600 is initiated by the user moving the cover 418 to the open position 504 (Block 602). Typically, the user will do so to remove or replace the media card 408, but may also do so (in the embodiment illustrated) to remove or replace the battery 130. As a result of the user moving the cover 418, the media detector 420 detects that the barrier 418 is no longer in, and hence has been moved from, the closed position 502, and the CPU 102 determines same pursuant to communication with detector 420 (Block 604).

As will be understood, the detector 420 is preferably configured to generate an interrupt signal to the CPU 102 (and the operating system 103) when the cover 418 is not in the closed position 502 (although alternate configurations for generating an interrupt are possible).

Upon receipt of the interrupt signal, the operating system 103 is programmed to execute the media memory preservation application 430 (Block 606). The preservation application 430 is programmed to cause the operating system 103 to transfer or update to the media card storage 410 any data files 416 or data file segments currently in the cache 440 and designated for storage in the media storage 410 (Block 608). As well, the preservation application 430 is programmed to cause the operating system 103 to update the file allocation table 412 data (and any directory entries) (Block 610).

The application 430 may also be programmed to cause the operating system 103 to provide a sensory indicator to the user upon detection of the movement of the barrier 418 from the closed position 502 (Block 612). Such sensory indicator may be in the form of an audible warning tone or beep emitted by the speaker 118, and may also be in the form of a pop-up screen display 700 similar to that illustrated in the screen shot of FIG. 7. Such screen display 700 may include an image segment 701 (eg. "Safely Remove Media Card?") requesting user input 702, 704 regarding the user's intentions to remove the media card 408 (Block 614). The user input may conveniently be in the form of "buttons" (eg. "Yes" button 702, "No" button 704)

Utilizing the keyboard 116 or one or more of the user input components in the auxiliary I/O subsystem 112, such as a trackwheel, track-ball, directional pad or joystick, the user "clicks" or otherwise generates user input 702, 704 received by the CPU and corresponding to whether or not the user intends to remove the media card 408 from the media port 406 (Block 616).

If the user input 702 corresponds to the user's intention to remove the media card 408, the application 430 may cause the operating system 103 to unmount the media card 408 (Block 618). This user input 702 is typically configured to be the default user input response 702, 704. The media card 408 may then be removed from the media port 406 by the user, as discussed below in greater detail in connection with Blocks 626-634.

However, if the user input 704 corresponds to a user decision to not remove the media card 408, the media memory preservation application 430 is preferably configured to cause the operating system 103 to adjust its operating parameters with respect to accessing the media card 408 (Block 624), and the memory preservation application 430 may terminate in accordance with Block 634 discussed below.

As will be understood, allowing the media card 408 to be accessed by the operating system 103 while the cover 418 is removed 504 introduces risk to the card's 408 data integrity since either the battery 130 or the card 408 might be removed (despite the user's input 704 not to do so). Accordingly, the operating system's operating parameters would preferably be adjusted to ensure that more frequent commit operations are performed to transfer file data from the cache 440 to the media storage 410, thereby reducing the length of time that file data might stay in the disk cache 440. Such a measure will reduce the window of opportunity for data corruption to occur if the card 408 is removed from the media port 406, but causes a corresponding reduction in the performance speed of the CPU 102.

The screen display 700 may also include an image segment 706 (eg. displaying text such as "Don't ask this again") permitting the user to "click" or otherwise input user input 708 (which may conveniently be in the form of a "button") corresponding to an instruction not to display the screen display 700 in the future (Block 622). While Block 622 has been illustrated separately from Block 616 for simplicity of illustration, it should be understood that at least the first iteration of Block 622 may occur concurrently with Block 616.

If the user does input the user input 708 instructing the operating system 103 not to display the screen display 700 in the future, such user preference (including the user input 702, 704 input at the same time pursuant to Block 616) may be stored by the operating system 103 in memory 108 (Block 628). In future iterations of the method 600, in Block 612 the pop-up screen 700 will not be displayed and the application 430 will skip to Block 616. Instead of awaiting user input 702, 704, Block 616 will instead utilize the user input 702, 704 stored in Block 624.

Figure 8:
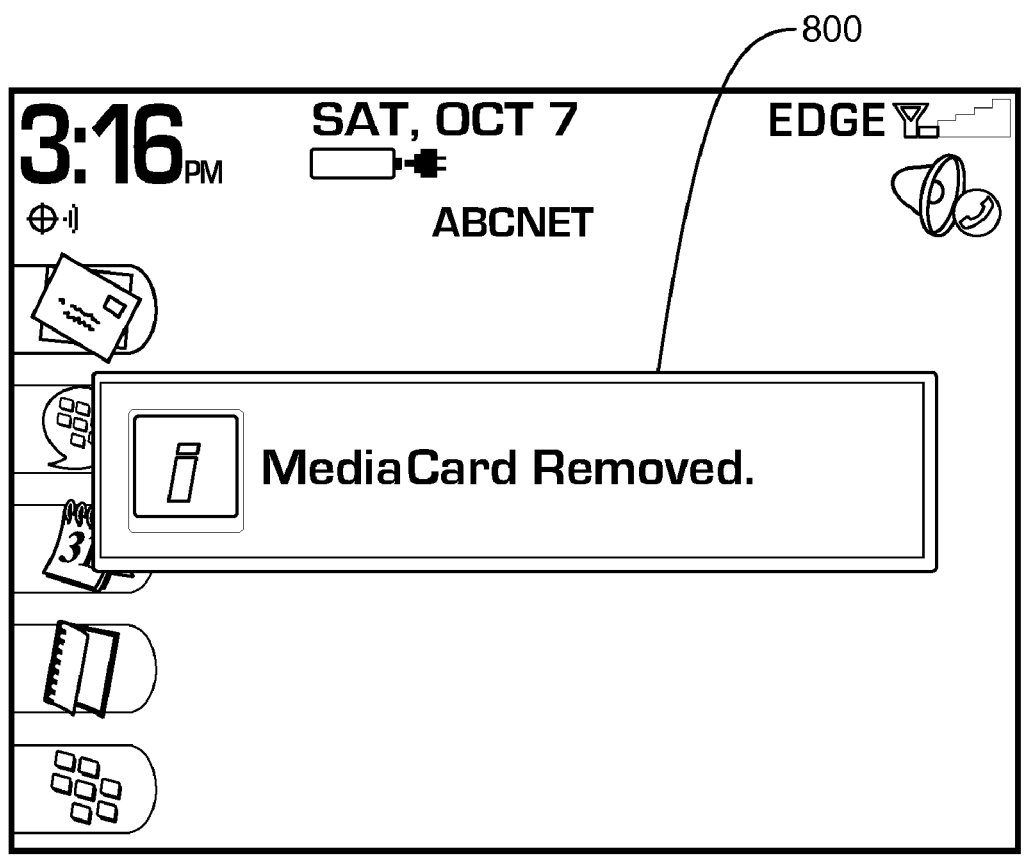
FIG. 8 is a screen shot of an example pop-up screen display shown on a display of the mobile device, indicating that the media card has been removed.

The removal of the media card 408 is detected by the operating system and the application 430 may cause the operating system to generate a pop-up display image 800 similar to that of the screen shot illustrated in FIG. 8 (eg. displaying text such as "Media Card Removed"), indicating that the media card 408 has been removed (Block 626).

Figure 9:
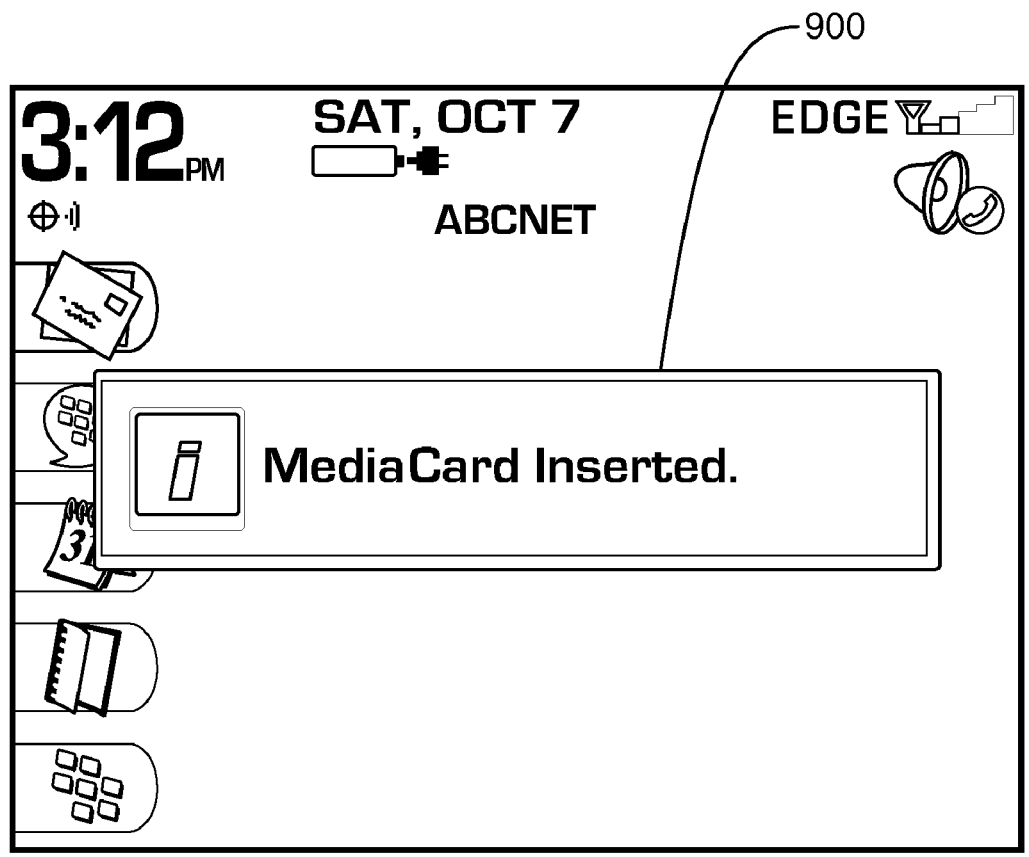
FIG. 9 is a screen shot of an example pop-up screen display shown on a display of the mobile device, indicating that a media card has been inserted.

Upon detection of the insertion of a media card 408 into the media port 406 by the operating system 103, the application 430 may cause the operating system to generate a pop-up display image 900 similar to that illustrated in the screen shot of FIG. 9 (eg. displaying text such as "Media Card Inserted"), indicating that the media card 408 has been inserted (Block 628).

Ultimately, the user will move the cover 418 back to the closed position 502 (Block 630). As a result of the user moving the cover 418, the media detector 420 detects that the barrier 418 is now in the closed position 502, and the CPU 102 determines same pursuant to communication with detector 420 (Block 632). The media memory preservation application 430 is preferably then configured to end and the previously interrupted operating system 103 operations resume (Block 634).

While the above description provides examples of the embodiments, it will be appreciated that some features and/or functions of the described embodiments are susceptible to modification without departing from the spirit and principles of operation of the described embodiments. Accordingly, is been described above is intended to be illustrative of the invention and non-limiting.

The invention claimed is:

1. A method for maintaining data integrity on removable storage media of an electronic device, the device having:
a media port configured to releasably receive the storage media;
a movable barrier; and
a detector configured to detect when the barrier is moved, the method comprising:
detecting when the barrier is moved; and
requesting input regarding removal of the storage media.

2. The method as claimed in claim 1, further comprising updating the data stored on the removable storage media in response to the detecting.

3. The method as claimed in claim 1, further comprising enabling receipt of the input via an input component of the electronic device, the input component enabling selection of predefined input responses.

4. The method as claimed in claim 1, further comprising unmounting the storage media from an operating system of the electronic device.

5. A computer readable medium storing program code executable by a processor of an electronic device for causing the processor to perform the method of claim 1.

6. A method for maintaining data integrity on removable storage media of an electronic device, the device having:
a media port configured to releasably receive the storage media;
a movable barrier; and
a detector configured to detect when the barrier is moved, the method comprising:
detecting when the barrier is moved; and
updating the data stored on the removable storage media in response to the detecting.

7. The method as claimed in claim 6, wherein the data stored on the storage media comprises file allocation table data and wherein the updating comprises updating the file allocation table data.

8. The method as claimed in claim 6, further comprising providing on a screen of a display of the electronic device a display image notifying of the occurrence of one or more predetermined events in relation to the electronic device.

9. The method as claimed in claim 8, further comprising detecting that the storage media has been removed from the media port and wherein the display image notifies that the storage media has been removed from the media port.

10. The method as claimed in claim 6, further comprising providing a sensory indicator upon detection of the movement of the barrier.

11. The method as claimed in claim 10, wherein the sensory indicator comprises an audible tone.

12. An electronic device, comprising:
a media port configured to releasably receive storage media;
a moveable barrier;
a detector configured to detect when the barrier is moved;
a processor operatively coupled to the media port and to the detector wherein the processor is configured to update data stored on the storage media when the barrier is moved.

13. The device as claimed in claim 12, further comprising a chamber, wherein the media port is positioned within a chamber and wherein the chamber is configured to receive the media storage.

14. The device as claimed in claim 13, wherein the barrier comprises a chamber cover.

15. The device as claimed in claim 14, wherein the detector comprises a contact switch operatively coupled to the cover.

16. The device as claimed in claim 12, further comprising a battery chamber, wherein the media port is positioned within the battery chamber.

17. The device as claimed in claim 16, wherein the barrier comprises a battery cover.

18. The device as claimed in claim 12, wherein the storage media comprises a flash memory card.

19. The device as claimed in claim 12, wherein the stored data comprises a file allocation table.

* * * * *